United States Patent
Giri et al.

(10) Patent No.: US 11,935,069 B2
(45) Date of Patent: Mar. 19, 2024

(54) EVENT-DRIVEN PLATFORM FOR PROACTIVE INTERVENTIONS IN A SOFTWARE APPLICATION

(71) Applicant: INTUIT INC., Mountain View, CA (US)

(72) Inventors: Neha Giri, Mississauga (CA); Hemanth Nellitheertha, Bengaluru (IN); Bhargava Narayana, Bengaluru (IN); Manish Jain, Bengaluru (IN); Divya Kumar, Bengaluru (IN); Arun Kumar A, Bengaluru (IN)

(73) Assignee: Inuit, Inc., Mountain View, CA (US)

( * ) Notice: Subject to any disclaimer, the term of this patent is extended or adjusted under 35 U.S.C. 154(b) by 13 days.

(21) Appl. No.: 17/487,250

(22) Filed: Sep. 28, 2021

(65) Prior Publication Data

US 2023/0095109 A1    Mar. 30, 2023

(51) Int. Cl.
| | |
|---|---|
| *G06Q 30/016* | (2023.01) |
| *G06F 9/451* | (2018.01) |
| *G06N 20/00* | (2019.01) |
| *G06Q 30/0207* | (2023.01) |

(52) U.S. Cl.
CPC .......... *G06Q 30/016* (2013.01); *G06F 9/453* (2018.02); *G06N 20/00* (2019.01); *G06Q 30/0224* (2013.01)

(58) Field of Classification Search
None
See application file for complete search history.

(56) References Cited

U.S. PATENT DOCUMENTS

| | | | | |
|---|---|---|---|---|
| 2019/0205761 | A1* | 7/2019 | Wu | .......................... G06N 3/04 |
| 2019/0205912 | A1* | 7/2019 | Ericson | .............. G06Q 30/0239 |
| 2019/0379615 | A1* | 12/2019 | Karp | ....................... H04L 51/02 |
| 2020/0019420 | A1 | 1/2020 | Saimani et al. | |
| 2020/0019893 | A1 | 1/2020 | Lu | |

OTHER PUBLICATIONS

European Search Report issued to Application No. 22175242.1-1218 dated Nov. 10, 2022.

* cited by examiner

*Primary Examiner* — Michael J Sittner
(74) *Attorney, Agent, or Firm* — Patterson + Sheridan, LLP

(57) ABSTRACT

Aspects of the present disclosure relate to proactive intervention in a software application. Embodiments include selecting, by a proactive intervention system related to an application, an event of a plurality of events related to use of the application for processing based on event priorities associated with the plurality of events. Embodiments further include receiving, by the proactive intervention system, contextual information related to the event. Embodiments further include determining, by the proactive intervention system, a proactive intervention based on the event and the contextual information. Embodiments further include determining, by the proactive intervention system, that the proactive intervention can presently be provided based on intervention availability data. Embodiments further include providing, by the proactive intervention system, the proactive intervention via a user interface associated with the application.

14 Claims, 5 Drawing Sheets

EVENT-DRIVEN PLATFORM FOR PROACTIVE INTERVENTIONS IN A SOFTWARE APPLICATION

INTRODUCTION

Aspects of the present disclosure relate to techniques for proactive interventions in software applications. In particular, techniques described herein involve event-driven determinations of proactive interventions, such as to resolve issues related to use of a software application.

BACKGROUND

Every year millions of people, businesses, and organizations around the world utilize software applications to assist with countless aspects of life. For example, many businesses rely on software applications for creating invoices and billing customers for products and services. Software applications are generally configured to allow users to perform various functions through interactions with a user interface.

In some cases, issues may be encountered during use of a software application, and the presence of the issues and/or solutions to the issues may not be immediately apparent to a user. In some cases, proper use of an application may require the performance of particular steps, and users may encounter difficulties if they are not familiar with the application. Thus, users may encounter issues related to improper use of the application, lack of understanding of steps that need to be performed, configuration errors, uncertainty about where to find content, and/or the like. While many software applications offer help content and other forms of assistance, users may be unaware of such assistance, may not realize the need for such assistance, may have difficulty locating such assistance when needed, and/or may find it inconvenient to navigate through multiple screens of the application to access such assistance.

As such, there is a need in the art for improved techniques of assisting users with resolving issues related to use of software applications

BRIEF SUMMARY

Certain embodiments provide a method for proactive intervention in a software application. The method generally includes: selecting, by a proactive intervention system related to an application, an event of a plurality of events related to use of the application for processing based on event priorities associated with the plurality of events; receiving, by the proactive intervention system, contextual information related to the event; determining, by the proactive intervention system, a proactive intervention based on the event and the contextual information; determining, by the proactive intervention system, that the proactive intervention can presently be provided based on intervention availability data; and providing, by the proactive intervention system, the proactive intervention via a user interface associated with the application.

Other embodiments provide a method for proactive intervention in a software application. The method generally includes: selecting, by a proactive intervention system related to an application, an event of a plurality of events related to use of the application for processing based on event priorities associated with the plurality of events; parsing, by the proactive intervention system, the event to extract one or more intervention-related attributes; receiving, by the proactive intervention system, contextual information related to the event; determining, by the proactive intervention system, a proactive intervention based on the one or more intervention-related attributes and the contextual information; determining, by the proactive intervention system, that the proactive intervention can presently be provided based on intervention availability data; and providing, by the proactive intervention system, the proactive intervention via a user interface associated with the application.

Other embodiments provide a system comprising one or more processors and a non-transitory computer-readable medium comprising instructions that, when executed by the one or more processors, cause the system to perform a method. The method generally includes: selecting, by a proactive intervention system related to an application, an event of a plurality of events related to use of the application for processing based on event priorities associated with the plurality of events; receiving, by the proactive intervention system, contextual information related to the event; determining, by the proactive intervention system, a proactive intervention based on the event and the contextual information; determining, by the proactive intervention system, that the proactive intervention can presently be provided based on intervention availability data; and providing, by the proactive intervention system, the proactive intervention via a user interface associated with the application.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
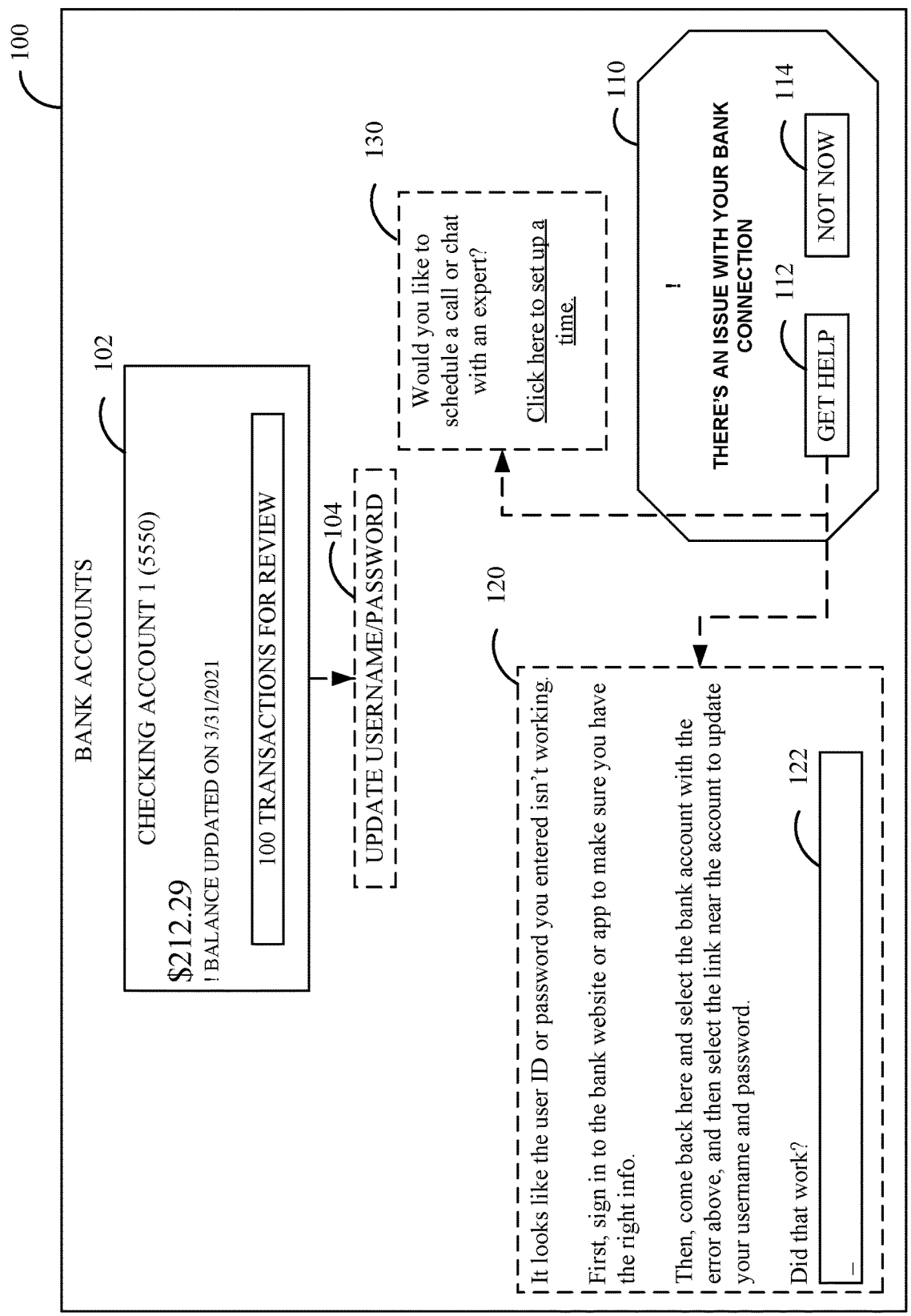
FIG. 1 depicts an example user interface screen related to proactive intervention in a software application.

Aspects of the present disclosure provide apparatuses, methods, processing systems, and computer-readable mediums for proactive intervention in a software application.

According to certain embodiments, a proactive intervention system within or associated with an application determines whether to provide proactive interventions to users of the application based on events related to use of the application. A proactive intervention generally refers to assistance that is provided to a user of an application without the user explicitly requesting such assistance or taking direct action to initiate such assistance, and may include help content, an offer of assisted support or discount, initiating a session with a chatbot, and/or the like. In some embodiments, proactive intervention is provided via a user interface associated with an application, as described in more detail below with respect to FIG. 1.

Events related to use of the application may be generated based on activities performed by a user of the application, such as navigating through pages of the application, entering data, selecting user interface components, and/or the like. In some embodiments, the proactive intervention system analyzes events according to rules and/or machine learning techniques at various stages of a process in order to determine whether to provide proactive interventions, and (e.g., after determining whether to provide proactive interventions) to determine which proactive interventions to provide.

Rules may be set in advance, such as by a programmer or product expert, and/or may be configured dynamically over time. In certain embodiments, the proactive intervention system provides a console by which a user, such as an administrator or product expert, can configure rules related to proactive interventions. For instance, the console may include a user interface by which a user can indicate conditions under which certain types of proactive interventions are to be provided, such as through interactions with user interface components. In one example, a rule indicates that if a user accesses a product feedback feature and provides negative feedback, then an offer of help and/or a discount is to be provided to the user.

Machine learning techniques may also be utilized in certain embodiments. Machine learning techniques may involve the use of machine learning models that are trained using historical data. For example, if a set of input features describes one or more application events and the target value is whether a particular intervention should be proactively provided, a machine learning model can be trained to predict whether the particular intervention should be proactively provided based on the input features.

The predictive accuracy a machine learning model achieves ultimately depends on many factors. Ideally, training data for the machine learning model should be representative of the population for which predictions are desired (e.g., unbiased and correctly labeled). In addition, training data should include a substantive number of training instances relative to the number of features on which predictions are based and relative to the range of possible values for each feature. In one embodiment, a set of events for which a given intervention is known to be relevant (e.g., based on historical application data indicating that the given intervention was accessed and/or that users responded positively to the given intervention after certain events occurred) are used to train a machine learning model. In certain aspects, training a machine learning model is a supervised learning process that involves providing training inputs (e.g., sets of features describing events and, in some embodiments, contextual information related to events) as inputs to the machine learning model and iteratively adjusting parameters of the model based on comparing outputs from the model to labels (e.g., indicating whether certain interventions are relevant to the events) associated with the training inputs in the training data.

Thus, when a given event is received by the proactive intervention system, it may apply one or more rules and/or utilize one or more machine learning models to determine whether to provide one or more proactive interventions based on the given event. Contextual information related to the given event may also be utilized in the determination. For example, contextual information may include user data (e.g., attributes of the user, such as length of use of the product, level of expertise, occupation, account type, and/or the like), application, platform, and/or device attributes (e.g., versions, capabilities, and/or the like), clickstream data preceding the given event, application data related to an event (e.g., information about a bank account for which an error is being encountered if the event relates to the error), and/or the like.

Events that may indicate that a user is experiencing an issue and that proactive intervention may be warranted may include, for example, a failure to connect to a user's bank account, receiving an incorrect type of input for a user interface component (e.g., non-numerical input in a field for which numerical input is expected), a user attempting to access a feature that is not supported by the device, platform, or application, remaining on a single page of the application for a threshold amount of time, the user providing negative feedback related to the application, and/or the like.

In some embodiments, event priorities are assigned to events by a watcher component of the proactive intervention system, such as based on rules indicating which events are most likely to require timely intervention. Event priorities may be used by the proactive intervention system to determine an order for processing events, such as processing higher-priority events first, thereby avoiding delays in providing proactive interventions after the occurrence of high-priority events. High priority events may include, for example, events likely to indicate an intent to abandon use of the product, such as a user providing negative product feedback.

The proactive intervention system may determine more than one proactive intervention to provide based on an event, and may assign priorities to the proactive interventions (e.g., based on confidence scores output by a machine learning model, degrees of association between features of the event and conditions indicated in a rule, priority values assigned to particular interventions (e.g., by a product expert), and/or the like). The priorities assigned to proactive interventions may be used to determine which of the proactive interventions to provide, an order for providing the proactive interventions, and/or the like.

According to certain embodiments, the proactive intervention system uses data related to availability of proactive interventions to determine whether a particular proactive intervention can currently be provided. For example, the proactive intervention system may determine whether one or more support professionals are currently available for an assisted support session, whether a discount or offer is presently available to the user, and/or the like based on live information about such availability. In one example, if the proactive intervention system determines two proactive interventions that may be relevant based on an event, and the higher-priority intervention of the two is not currently available (e.g., if there are no support professionals available for an assisted support profession), the proactive intervention system may provide the lower-priority intervention to the user.

In some embodiments, the proactive intervention system utilizes a proactive intervention module associated with the application user interface to provide proactive interventions to the user. The proactive intervention module may make context-based determinations of which proactive interventions to provide and/or an order for providing the proactive interventions. For example, the proactive intervention module may consider whether any proactive interventions have previously been provided within the current session, which proactive interventions have been previously provided, how the user has responded to previously-provided proactive interventions, and/or the like. In one example, the proactive intervention module only provides a set number of proactive interventions within a given session. In another example, if the user previously ignored or responded negatively to a particular type of proactive intervention (e.g., an offer to initiate an assisted support call), then the proactive intervention module may determine not to provide any additional proactive interventions of the particular type to the user, or may prioritize other types of proactive interventions, such as by providing the other types of proactive interventions before the particular type.

Proactive interventions determined and provided according to techniques described herein may include both in-session interventions and offline interventions. In-session interventions include assistance provided via a user interface associated with an application during a session in which a user interacts with the application via the user interface. Examples of in-session interventions include displaying offers within the user interface (e.g., for discounts, to initiate assisted or automated support, and/or the like), automatically initiating chat sessions, providing help content (e.g., articles, forum posts, and/or the like) or links to help content, and/or the like.

Offline interventions include assistance provided outside of the user interface associated with the application. Examples of offline support include providing help content, discounts, offers of assisted or automated support, and/or the like via email, phone call, text message, and/or the like.

In some cases, contextual information related to events is used when providing proactive interventions. For example, if the proactive intervention system determines to that a chat bot session is an appropriate proactive intervention based on a particular event, contextual information related to the particular event may be provided to the chat bot to inform its operation. For instance, if the event relates to the user's bank account transaction data not being imported in the application, and contextual information indicates that there was an error logging in to the bank account by the application using the login information that was provided by the user, this contextual information may be provided to the chat bot so that the chat bot can address this issue and offer a solution (e.g., providing information relating to updating the user's bank account login information in the application).

Certain embodiments involve monitoring users' responses to proactive interventions in order to continuously improve the proactive intervention system. For example, determinations of whether to use particular proactive interventions again may be based on whether users responded positively (e.g., by accepting offers of help or discounts, clicking on links, providing positive feedback in surveys, and/or the like) or negatively (e.g., by ignoring the proactive interventions, closing the proactive interventions, providing negative feedback in surveys, and/or the like) to the interventions. Furthermore, determinations may be made of whether proactive interventions were successful in resolving users' problems, such as based on subsequent event data and/or direct feedback from the users. These data points may be used to modify rules and/or machine learning models and/or to set scores associated with proactive interventions in order to cause the proactive intervention system to favor proactive interventions that received higher amounts of positive user responses and/or were more frequently effective in resolving issues. In certain embodiments, particular proactive interventions may be tested by providing them to a limited set of users and monitoring the users' responses to the proactive interventions and/or whether the proactive interventions were successful in resolving issues, and the testing is used to determine whether to utilize the proactive interventions for other users.

Embodiments of the present disclosure provide multiple improvements over conventional techniques for assisting users of applications. For example, by analyzing events as they occur during use of the application according to rules and/or machine learning techniques to determine whether to provide proactive interventions, techniques described herein allow issues related to application use to be promptly identified and addressed in an automated manner. Providing interventions proactively without requiring users to request assistance or locate and access assistance within the application allows assistance to be provided in a prompt manner with minimal or no effort on the part of the user, causing issues to be resolved more efficiently and thereby improving the functioning of the application. Furthermore, by utilizing context information associated with events when determining whether to provide proactive interventions, and to enrich the proactive interventions themselves (e.g., by providing a chat bot with useful contextual information), techniques described are able to target interventions more accurately to specific situations than are existing techniques that rely solely on events themselves.

Additionally, by utilizing data about the effectiveness of previously-provided proactive interventions and/or user feedback to aid in subsequent determinations of which proactive interventions to provide, techniques described herein allow the proactive intervention system to be continuously improved.

Example User Interface Screen Related to Proactive Interventions in a Software Application FIG. 1 depicts an example user interface screen 100 related to proactive interventions in a software application. For example, screen 100 may be associated with a software application that allows users to perform financial management tasks, such as importing of transaction data from bank accounts. In some cases, screen 100 may be associated with a user interface running on a computing device (e.g., system 500 of FIG. 5), such as a desktop computer, laptop computer, mobile phone, tablet, or the like.

Screen 100 includes a control 102 associated with a checking account (e.g., having an account number ending 5550). For example, the user of the application associated with screen 100 may have provided information related to the checking account in order to allow the application to access the checking account in order to retrieve transaction data.

Control 102 indicates that the checking account has a balance of $212.29, that the balance was last updated on Mar. 31, 2021, and that there are 100 transactions currently available for review that have been imported from the checking account. In one example, an event indicates that there was an error logging in to the checking account by the application. The event is provided to a proactive intervention system, such as that described in more detail below with respect to FIG. 2, along with contextual information (e.g., indicating the checking account to which the error relates, the login information that the application used to attempt to log in to the checking account, when the login information was provided by the user, and/or the like) and the proactive intervention system determines to provide an offer to initiate a chat bot session as a proactive intervention.

Control 110 is displayed within screen 100 in order to provide the proactive intervention. Control 110 indicates that there was an issue with the bank connection, and includes an offer for help via control 112. If the user select control 112, chat bot session 120 and/or message 130 is launched within screen 100. Chat bot session 120 and message 130, which are two alternative options, are shown in broken lines because either may optionally be displayed. Alternatively, control 114 allows the user to reject the proactive intervention. Selecting control 114 causes control 110 to be closed or, in some embodiments, minimized so that the user can access it at another time.

Chat bot session 120 allows the user to interact with an automated support system that provides information related to resolving the issue with the bank connection. The chat bot is provided with contextual information, such as which account the error relates to, so that it can provide more targeted support to the user. The chat bot instructs the user to sign in to the bank website or application to ensure that the user has the correct login information, and then to update the login information in the present application. A control 104 is provided within screen 100 that allows the user to update the username and password associated with the checking account. The user may select control 104 and update the username and/or password associated with the checking account in order to resolve the issue. For example, the user may have changed the username and/or password of the checking account since adding the checking account to the application, and so the username and/or password stored in the application may be out of date.

The user may provide a response to the chat bot via control 122 indicating whether the suggested solution was effective in resolving the issue. If the user indicates that the suggested solution was not effective, the chat bot may suggest one or more alternative solutions and/or an offer of assisted support by a live support agent may be provided to the user.

Message 130 includes an offer to schedule a call or chat with a live support agent, along with a link to schedule such a support session. For example, clicking on the link may cause an additional window to be displayed that allows the user to select a day and/or time for a call or chat. In some embodiments, the window may include a control by which the user can provide a phone number at which the user can be reached at the scheduled time, or the user is provided with a phone number to call. Chat bot session 120 and message 130 are included as examples of proactive interventions, and other types and/or formats of proactive interventions may alternatively or additionally be provided. In certain embodiments, chat bot session 120 or message 130 (e.g., whichever of the two options is displayed) is implemented via templates associated with the user interface of the application that match a style of the overall user interface. In some cases, the application has existing chat bot or messaging functionality, and this existing functionality is invoked (e.g., via application programming interface (API) calls) in order to display chat bot session 120 or message 130.

Figure 2:
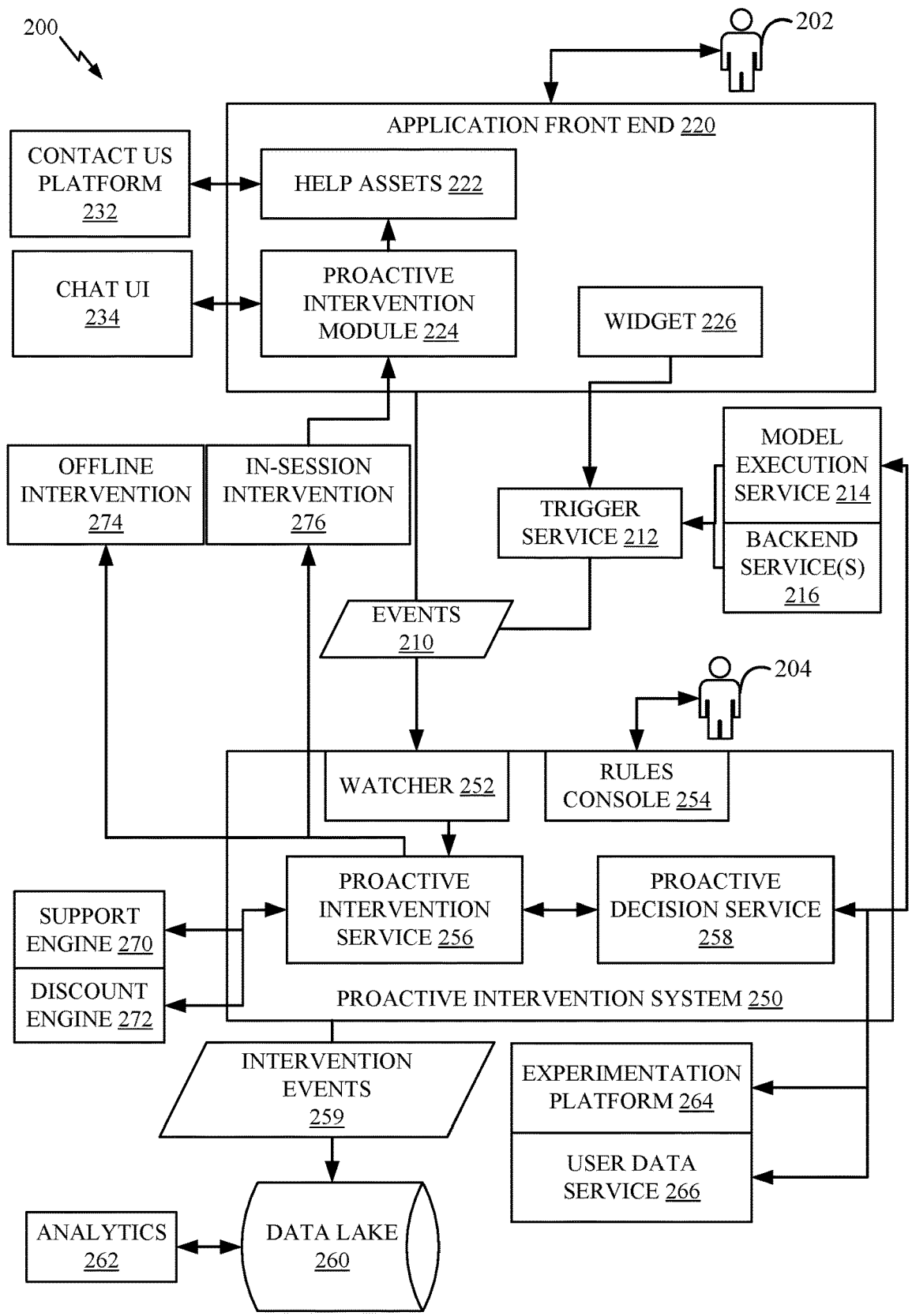
FIG. 2 depicts an example computing components related to proactive intervention in a software application.

The user's interactions with the controls displayed in screen 100 may be monitored, such as by proactive intervention module 224 of FIG. 2 and/or one or more additional components, in order to determine whether the user responded favorably to the proactive intervention and/or whether the proactive intervention was successful in resolving the issue. This feedback may be used to improve the proactive intervention system's future decisions of which proactive interventions to provide based on subsequent events, such as by updating one or more rules, re-training one or more machine learning models, and/or the like.

Example Components Related to Proactive Interventions in a Software Application

FIG. 2 is an illustration 200 of example computing components related to proactive intervention in a software application.

Application front end 220 generally comprises a user-facing portion of an application, such as components associated with a user interface (e.g., corresponding to screen 100 of FIG. 1). A user 202 interacts with the application via application front end 220, such as by interacting with user interface controls.

Events 210 are generated based on activities occurring with respect to application front end 220, such as based on actions performed by user 202 within the application and actions performed by the application itself, such as logging into accounts. Events 210 generally include clickstream data (e.g., user-initiated actions) occurring within the application that may be generated as a result of tracking beacons being activated from within the application when activities are performed. Clickstream data generally includes records of "clicks" or user actions within an application, indicating a path by which the user navigates through the application and interacts with user interface components. In some embodiments, events 210 are associated with contextual information related to the events.

A trigger service 212 serves as an entry point to proactive intervention system 250 for events other than clickstream data, such as events generated by widget 226, model execution service 214, and/or backend services 216. Trigger service 212 generally receives these events and sends them to watcher 252. For example, in addition to clickstream data, some events 210 may be generated based on one or more additions components, such as widget 226. Widget 226 may, for instance, be a third-party plugin that does not directly publish events to the application event bus, and may send events to trigger service 212 as a means of providing the events to proactive intervention system 250.

A model execution service 214 may also generate events. Model execution service 214 generally comprises an execution environment in which one or more machine learning models execute. In one example, a machine learning model is trained to predict which events generated by the application may be significant for proactive intervention, such as based on historical data indicating events for which interventions were provided, and may generate an event when it determines that one or more underlying events from the application are significant. As described in more detail below, machine learning models in model execution service 214 may also be used to determine which proactive interventions to provide based on events.

One or more backend services 216 may also generate events related to the application. For example, a backend service 216 may handle network connectivity for the application, and may generate events based on the establishment, changing, and/or ending of network connections. In another example, a backend service 216 may analyze user activity patterns, and may generate an event when it determines that a user activity pattern indicates a potential problem, such as when the user remains on a single page for a threshold amount of time.

Watcher 252 receives events 210, such as by subscribing to an event bus of the application, which sends events to subscribing entities. Watcher 252 then determines which events of events 210 are significant events for which proactive intervention may be warranted, such as based on rules.

Rules may be configured via a rules console 254, such as by a user 204 (e.g., product expert, application administrator, and/or the like). In some embodiments, rules console 254 allows rules to be configured without programming knowledge, such as via a graphical user interface through which a user 204 can indicate characteristics of events that may warrant proactive intervention. Rules may also indicate priorities associated with different event characteristics, and watcher 252 may assign priorities to events based on these rules. Priorities assigned to events by watcher 252 may be used by proactive interventions service 256 to determine an order for processing events, such as by processing higher-priority events before lower-priority events.

Watcher 252 may perform processing on events before sending them on to proactive intervention service 256, such as by removing event fields determined to be irrelevant to proactive interventions. For example, events generally include a plurality of fields indicating details of the event, and some of these fields (e.g., related to coordinates of a cursor) may not be relevant to proactive interventions. Thus, watcher 252 may parse through data included in events and determine which subset of the data is intervention-related, and may pass only the intervention-related subset of the data onwards.

Proactive intervention service 256 may generally act as an orchestration service for proactive intervention system 250 by processing events, passing them to proactive decision service 258 for decisions on whether to provide interventions, determining whether certain interventions are available, and communicating with various components to provide interventions. In particular, proactive intervention service 256 receives events that have been determined by watcher 252 to be significant, and may process the events in an order that is determined based on priorities assigned to the events by watcher 252.

In one example, watcher 252 places events into different buckets based on priority, and proactive intervention service 256 retrieves events from higher-priority buckets before events from lower-priority buckets. Proactive intervention service 256 generally serves as a broker between watcher 252, proactive decision service 258, and customer engagement components, such as proactive intervention module 224.

For example, proactive intervention service 256 may receive events from watcher 252 (e.g., via prioritized buckets), pass them to proactive decision service 258 in an order that is based on priorities associated with the events, and receive decisions from proactive decision service 258 (e.g., indicating which proactive interventions, if any, should be provided based on the events). Proactive intervention service 256 may then determine whether the proactive interventions indicated by proactive decision service 258 can be provided based on information retrieved from support engine 270 (e.g., a service that provides information related to customer support, such as indicating availability of support professionals) and discount engine 272 (e.g., a service indicating which discounts are available for a given user). Proactive intervention service 256 then provides available proactive interventions to one or more additional components for offline intervention 274 (e.g., interventions sent outside of the application, such as via email, text message, or phone call) and/or in-session intervention 276 (e.g., interventions displayed by proactive intervention module 224 via a user interface of application front end 220).

Intervention events 259, indicating information related to proactive interventions (e.g., events, contextual information, and other data related to proactive interventions that are determined to be provided and/or decisions not to provide proactive interventions), may also be provided to a data lake 260. Data lake 260 generally comprises a database or repository that stores information related to proactive interventions that were provided by proactive intervention system 250, such as for access by a support agent for use in resolving a customer issue, analysis by an analytics component 262, and/or the like. In some embodiments, analytics component 262 is configured to analyze data written to data lake 260 to determine which data points may be useful to a live support agent and providing those data points to the live support agent.

Proactive intervention decision service 258 generally applies rules and/or machine learning techniques to attributes of events (and, in some embodiments, contextual information associated with events) received from proactive intervention service 256 in order to determine whether proactive interventions should be provided based on the events. Attributes may be extracted from data fields of an event and/or from customer data (e.g., using user data service 266). In some embodiments, only intervention-related attributes are included in events sent by watcher 252, as watcher 252 may filter out all attributes that are not intervention-related, and so all attributes of the event may be extracted by proactive intervention decision service 258 and used in its determinations.

Rules may be defined via rules console 254, such as by a user 204. For example, rules console 254 may provide a user interface that allows the user 204 to indicate characteristics of events for which a particular proactive intervention should be provided. In one example, a rule specifies that if an event indicates that the user has spent more than a threshold amount of time on a given page, then a chat bot session should be initiated. In another example, a rule specifies that if an event indicates that the user has entered the wrong type of input for a particular control, then a message is to be displayed informing the user of the correct type of input for the particular control. In yet another example, a rule specifies that if an event indicates that the user is attempting to deactivate the user's account, then a live support session should be offered or automatically initiated. In an additional example, a rule specifies that if an event indicates that the user has provided negative feedback via a product survey, then a discount should be offered.

Machine learning techniques utilized by proactive decision service 258 may involve the use of one or more machine learning models executing within model execution service 214. For example, a machine learning model may have been trained based on features of historical events associated with indications of proactive interventions that were provided following the historical events (e.g., proactive interventions that were determined to be successful, such as based on user feedback or other data indicating successful resolution of issues). Proactive decision service 258 may provide features of events received from proactive intervention service 256 as inputs to the trained machine learning model, and may receive outputs from the trained machine learning model indicating one or more proactive interventions that should be provided based on the events or, in some cases, indications that no proactive interventions should be provided. In some embodiments abandonment scores may also be output by one or more trained machine learning models, and rules can be configured in proactive decision service 258 to provide intervention if the abandonment score is higher than a configured threshold. In some embodiments confidence scores may also be output by a trained machine learning model indicating strengths of association between the events and the proactive interventions indicated in the outputs.

In some embodiments, a combination of rules and machine learning techniques is utilized. For example, one or more rules may be applied to each event in addition to providing features of the event as inputs to a machine learning model.

Proactive decision service 258 may use contextual information associated with events in its analysis according to rules and/or machine learning techniques. For example, some types of contextual information may be included with the events (e.g., contextual information directly related to the events, such as the identity of the user performing an action, an account type of the user, a user interface component to which the action relates, and/or the like). Other contextual information may be retrieved by proactive decision service 258 for each event, such as by requesting the contextual information from the application. In some embodiments, proactive decision service 258 receives additional contextual information for events from user data service 266, which may provide data about users such as length of use of the application, occupation, historical responses to proactive interventions, and/or the like. Furthermore, proactive decision service 258 may receive outputs from one or more machine learning models as inputs. For example, a machine learning model may output an abandonment score for a customer based on one or more events (and, in some embodiments, related contextual information), and the abandonment score may be provided to proactive decision engine service 258. An abandonment score may indicate a likelihood of the customer abandoning use of the application. Contextual information (and, in some embodiments, additional information such as abandonment scores output by one or more machine learning models) may be included in rules and/or in the training of one or more machine learning models and, as such, contextual information and other types of information can be used along with events by proactive decision service 258 when applying rules and/or providing inputs to machine learning models. For example, a rule may indicate that if an abandonment score exceeds a threshold then a call to the customer from a support professional should be initiated as a proactive intervention.

Experimentation platform 264 generally comprises a component that performs testing of proactive interventions. For example, proactive interventions may be provided to particular users, and experimentation platform 264 may track user responses to the proactive interventions and/or data indicating whether the proactive interventions were successful in resolving issues. Accordingly, experimentation platform 264 may return information to proactive intervention decision service 258 indicating which proactive interventions received positive user responses and/or were successful in resolving issues, and proactive decision service 258 may use this information to determine which proactive interventions to utilize moving forward and/or in assigning priorities to proactive interventions. For example, proactive decision service 258 may associate scores with proactive interventions based on the feedback information received from experimentation platform 264 and/or other components that monitor user interactions with proactive interventions, and use the scores in determining which proactive interventions to provide in the future. In other cases, one or more machine learning models may be re-trained and/or one or more rules may be updated based on the feedback in order to improve future selections of proactive interventions (e.g., to favor proactive interventions that received positive user responses over proactive interventions that were ignored or otherwise received negative user responses).

In some embodiments, proactive decision service 258 determines priorities for proactive interventions that it determines to provide, such as based on confidence scores output by one or more machine learning models, strengths of association between events and rules, priority labels associated with proactive interventions (e.g., indicating that live support should always be prioritized over automated support), and/or the like. Thus, if proactive decision service 258 returns multiple proactive interventions in response to an event received from proactive intervention service 256, priorities may be associated with the proactive interventions and used to determine an order for providing the proactive interventions, and/or which proactive interventions to provide. In one example, only one proactive intervention is provided for a given event, and proactive intervention service 256 selects the highest-priority proactive interventions that it determines to be available. For instance, if the highest-priority proactive intervention is not available (e.g., because no live support agents are currently available), proactive intervention service 256 may provide the proactive intervention with the second highest priority.

Proactive interventions that proactive intervention service 256 determines to be available may be provided via offline intervention 274 and/or in-session intervention 276. Proactive intervention module 224 may be considered part of proactive intervention system 250 and/or or an agent of proactive intervention system 250 within product front end 220.

Proactive intervention module 224 receives in-session proactive interventions from proactive intervention service 256, and determines whether to provide the in-session proactive interventions via the user interface, such as based on whether there are any proactive interventions currently ongoing, how the user 202 has responded to previous proactive interventions of particular types (e.g., within the current session), and/or the like. For instance, proactive intervention module 224 may provide only one proactive intervention at a time, and/or may limit proactive interventions within a single session to a particular number, such as one. Furthermore, if user 202 has already closed a chat bot session within the current sessions (and/or another session), then proactive intervention module 224 may determine not to provide another chat bot session as a proactive intervention. Proactive intervention module 224 may determine an order for providing proactive interventions received from proactive intervention service 256 based on priorities associated with the proactive interventions, such as by displaying higher priority proactive interventions before lower-priority proactive interventions, or only displaying proactive interventions having a priority above a threshold. In one example, if one or more proactive interventions have already been displayed within the current session, proactive intervention module 224 will not display any additional proactive interventions that are not associated with a priority above a threshold, thereby limiting screen clutter.

In some embodiments, proactive intervention module 224 displays proactive interventions according to templates associated with the application, matching the style of the application's user interface. For example, the proactive intervention module 224 may receive information from proactive intervention service 256 indicating which proactive intervention template to use and may display a proactive intervention according to that template.

A chat user interface (UI) 234 provides a window in which user 202 can interact with a live support agent or an automated support agent (e.g., a chat bot). For example, chat UI 234 may allow for chat-based proactive interventions to be provided by proactive intervention module 224. In one example chat UI 234 corresponds to chat bot session 120 of FIG. 1.

Help assets 222 generally include help content, such as articles, forum posts, product support materials, and/or the like. Help assets 222 may also include information related to contacting support professionals, such as email addresses and/or phone numbers at which live support professionals may be reached. Proactive intervention module 224 may utilize help assets 222 to provide certain proactive interventions, such as those involving help content or scheduling a live support session. In one example, a "contact us" platform 232 allows a user to schedule a live support session at a particular time, such as by providing a phone number at which the user wishes to be contacted at the particular time or indicating that the user would like a chat session or phone call to be initiated at the particular time.

As described in more detail below with respect to FIG. 3, data related to providing proactive interventions, such as user feedback and/or other data indicating whether proactive interventions were successful in overcoming issues, may be monitored and used to improve decisions made by proactive intervention system 250 on an ongoing basis.

It is noted that the components and their arrangement as depicted and described with respect to FIG. 2 are included as an example, and alternative embodiments may involve more or fewer components with different arrangements. Furthermore, while some embodiments involve a single computing device, other embodiments may involve a plurality of computing devices, such as connected over a network. In one example, a client-server architecture is utilized whereby a user interacts with product front end 220 of an application via a client device, and certain aspects of the application (e.g., proactive intervention system 250) are implemented on one or more server computers remote from the client device and connected to the client device via a network.

Example Automated System Improvement

Figure 3:
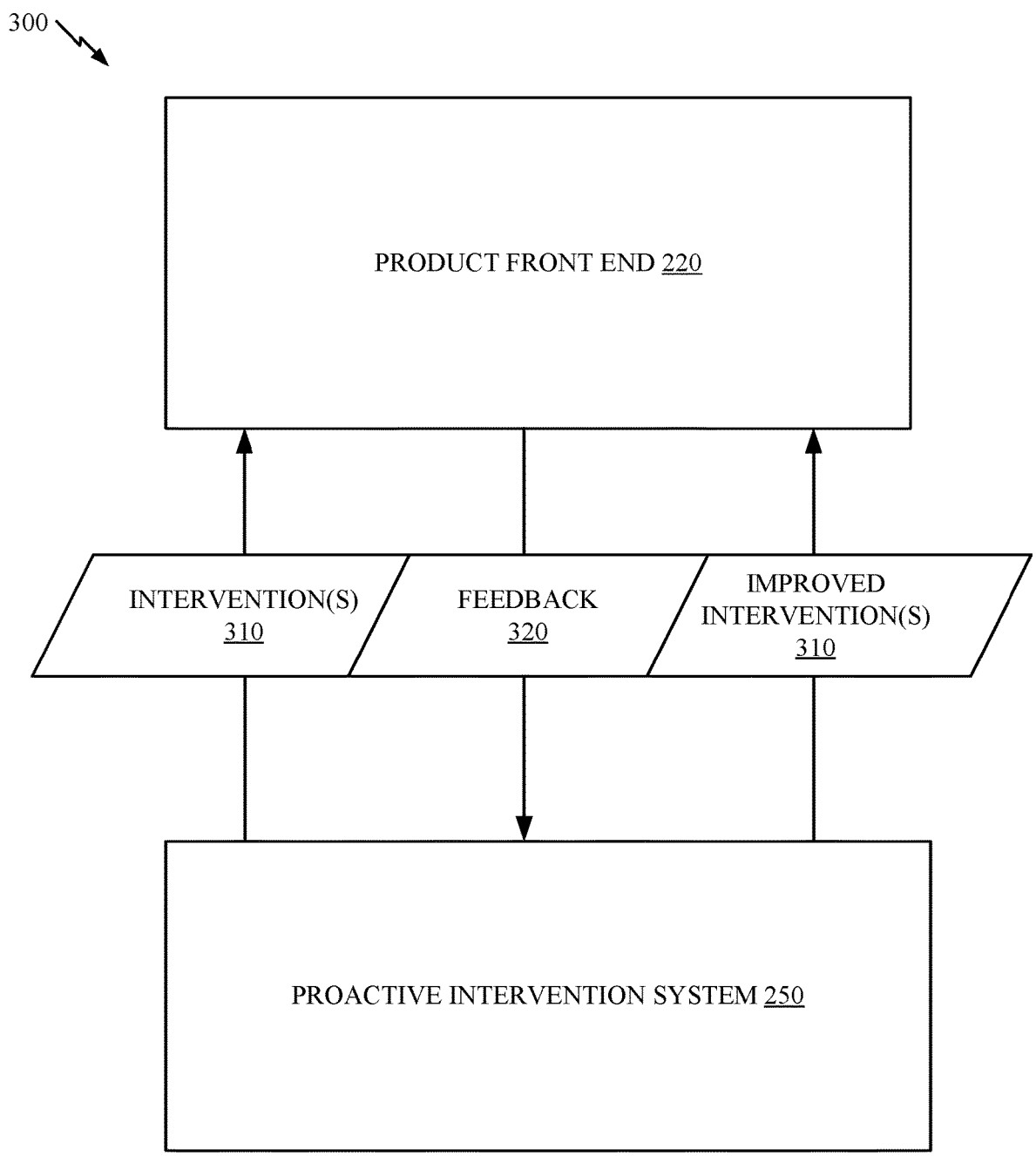
FIG. 3 depicts an example feedback loop related to proactive intervention in a software application.

FIG. 3 is an illustration 300 of an example feedback loop related to proactive intervention in a software application. For example, illustration 300 may relate to automatically improving decisions made by proactive intervention system 250 of FIG. 2 based on user feedback and other data indicative of the efficacy of proactive interventions.

Illustration 300 includes product front end 220 and proactive intervention system 250 of FIG. 2. Indications of one or more proactive interventions 310 are sent from proactive intervention system 250 to product front end 220, and the one or more proactive interventions are provided to a user. For example, the proactive interventions may include chat bot sessions, offers to schedule live support sessions, offers of discounts, help content, automatic configuration changes, and/or the like.

User responses to the proactive interventions are tracked, such as by determining whether a user accepts and/or interacts with a proactive intervention, ignores a proactive intervention, minimizes the proactive intervention to complete the current product flow (e.g., and engage with the proactive intervention later), closes or rejects a proactive intervention, provides negative feedback about a proactive intervention, and/or the like. Furthermore, application data may be monitored to determine whether a proactive intervention was successful at resolving an issue. For example, if an event indicates an account connection error and a proactive intervention is provided to address the issue, subsequent events may be monitored to see if the account connection error persists or if the account connection is subsequently successful. User response data and/or other data indicative of whether proactive interventions were successful are provided to proactive intervention system 250 as feedback 320.

Proactive intervention system 250 uses feedback 320 to improve subsequent proactive intervention determinations, thereby providing improved proactive interventions 310 based on feedback 320. In one example, one or more rules are created and/or modified based on feedback 320 (e.g., manually or automatically) to indicate that interventions that received positive feedback are to be utilized more commonly than or to the exclusion of interventions that received negative feedback. In another example, feedback 320 is used to update one or more machine learning models in order to improve subsequent outputs by the machine learning models. In another example, feedback 320 is used to modify priority values associated with proactive interventions, such as by assigning higher priorities to proactive interventions that received positive feedback and lower priorities to proactive interventions that received negative feedback.

Thus, over time, techniques described herein allow improved proactive interventions 310 to be refined such that the most effective proactive interventions are provided to users, thereby continuously improving the functioning of the system through a feedback loop.

Example Operations for Proactive Intervention in a Software Application

Figure 4:
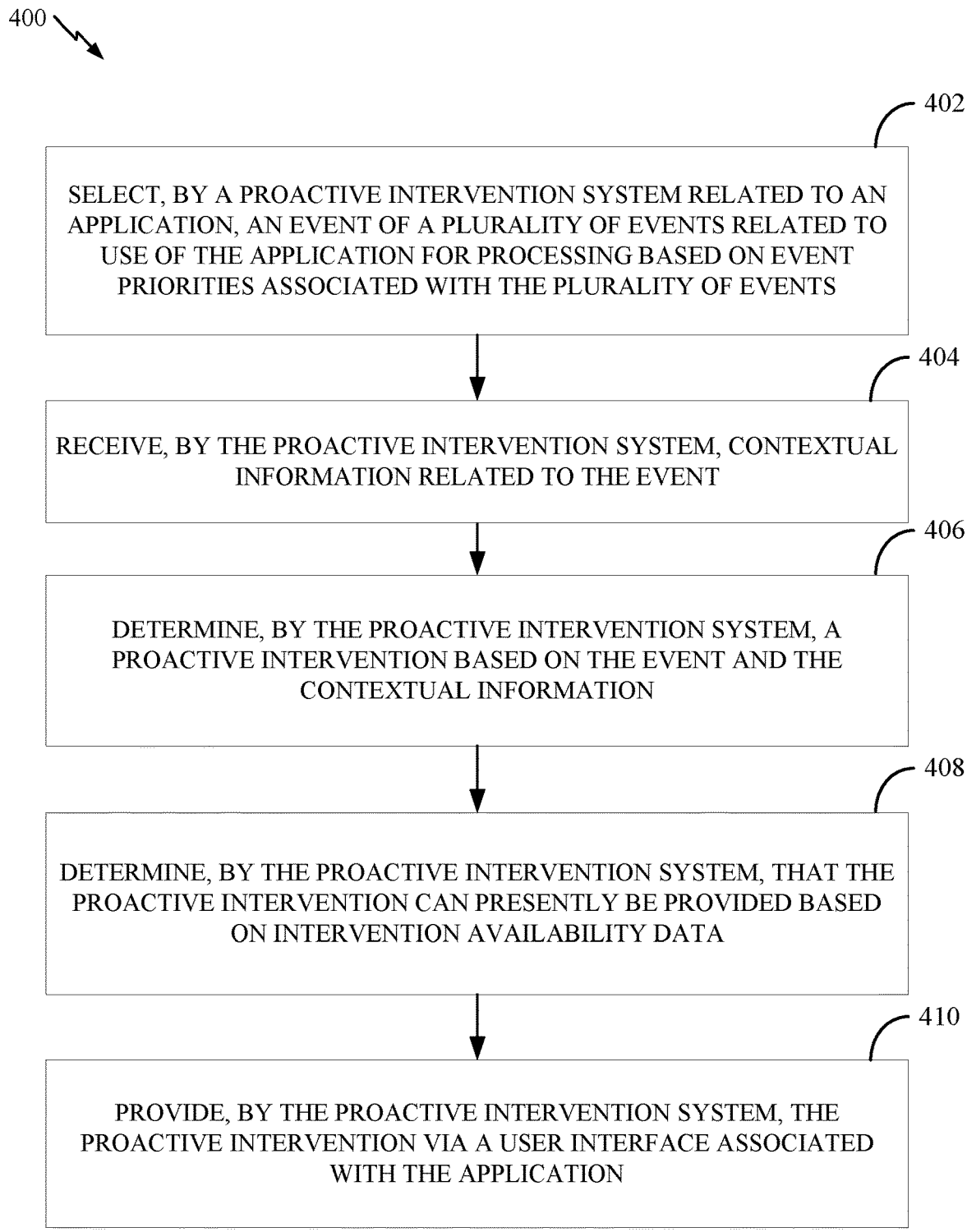
FIG. 4 depicts example operations related to proactive intervention in a software application.

FIG. 4 depicts example operations 400 related to proactive intervention in a software application. For example, operations 400 may be performed by proactive intervention system 250, proactive intervention module 224, and/or one or more additional components of FIG. 2.

Operations 400 begin at step 402 with selecting, by a proactive intervention system related to an application, an event of a plurality of events related to use of the application for processing based on event priorities associated with the plurality of events. Some embodiments comprise filtering, by an event watcher component (e.g., watcher 252 of FIG. 2) of the proactive intervention system, a stream of events to identify the plurality of events. In certain embodiments, the event watcher component determines the event priorities of the plurality of events based on attributes of the plurality of events. Some embodiments further comprise parsing, by the proactive intervention system, the event to extract one or more intervention-related attributes.

Operations 400 continue at step 404, with receiving, by the proactive intervention system, contextual information related to the event. Certain aspects of contextual information may be included with the event and other aspects of the contextual information may be retrieved by the proactive intervention system from the application and/or one or more additional components.

Operations 400 continue at step 406, with determining, by the proactive intervention system, a proactive intervention based on the event and the contextual information. Intervention-related attributes extracted from the event may be used to determine the proactive intervention. In some embodiments, determining, by the proactive intervention system, the proactive intervention based on the event and the contextual information comprises applying one or more rules and/or providing one or more inputs to a machine learning model based on the event and the contextual information and receiving one or more outputs from the machine learning model in response to the one or more inputs.

Operations 400 continue at step 408, with determining, by the proactive intervention system, that the proactive intervention can presently be provided based on intervention availability data.

Operations 400 continue at step 410, with providing, by the proactive intervention system, the proactive intervention via a user interface associated with the application. In some embodiments, providing, by the proactive intervention system, the proactive intervention via a user interface associated with the application comprises: offering automated or assisted support; providing help content; or offering a discount related to the application.

Certain embodiments further comprise determining to proceed with providing the proactive intervention based on one or more previous interventions provided via the user interface. Some embodiments further comprise determining a first intervention priority for the proactive intervention, determining an alternative proactive intervention based on the event and the contextual information, determining a second intervention priority for the alternative proactive intervention, and determining to provide the proactive intervention based on a comparison of the first intervention priority and the second intervention priority.

Notably, operations 400 is just one example with a selection of example steps, but additional methods with more, fewer, and/or different steps are possible based on the disclosure herein.

Example Computing System

Figure 5:
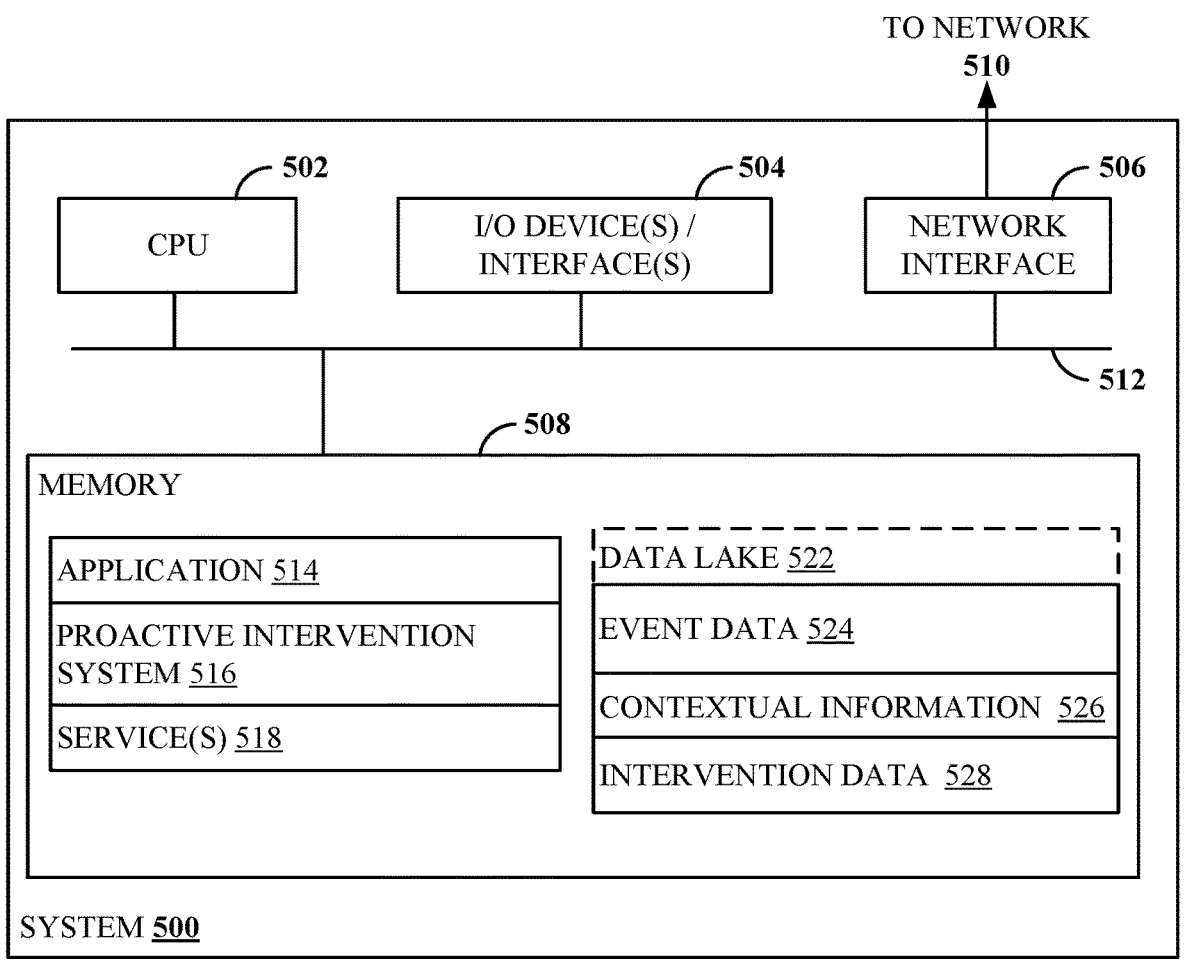
FIG. 5 depicts an example processing system for proactive intervention in a software application.

FIG. 5 illustrates an example system 500 with which embodiments of the present disclosure may be implemented. For example, system 500 may be configured to perform operations 400 of FIG. 4 and/or to implement one or more component as in FIG. 2.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes application 514, proactive intervention system 516, and one or more services 518. Application 514 may be representative of an application corresponding to application front end 220 of FIG. 2. In some embodiments, proactive intervention system 516 may be representative of proactive intervention system 250 of FIG. 2 and service(s) 518 may be representative of various services related to application 514 and/or proactive intervention system 516, such as model execution service 214, backend services 216, support engine 270, discount engine 272, experimentation platform 264, user data service 266, analytics 262, contact us platform 232, chat UI 234, and trigger service 212 of FIG. 2.

Memory 508 further (optionally) comprises data lake 522, which may correspond to data lake 260 of FIG. 2. Data lake 522 may additionally or alternatively be hosted in a separate database to which system 500 is connected via network 510. Memory 508 further comprises event data 524 and contextual information 526, which may include events 210 and intervention events 259 of FIG. 2, as well as associated contextual information. Memory 508 further comprises intervention data 528, which may include data related to proactive interventions provided by proactive intervention system 516, including data about the interventions themselves, data related to providing the interventions, feedback data related to the interventions, and/or the like.

It is noted that in some embodiments, system 500 may interact with one or more external components, such as via network 510, in order to retrieve data and/or perform operations.

Example Clauses

Clause 1: A method for proactive intervention in a software application, comprising: selecting, by a proactive intervention system related to an application, an event of a plurality of events related to use of the application for processing based on event priorities associated with the plurality of events; receiving, by the proactive intervention system, contextual information related to the event; determining, by the proactive intervention system, a proactive intervention based on the event and the contextual information; determining, by the proactive intervention system, that the proactive intervention can presently be provided based on intervention availability data; and providing, by the proactive intervention system, the proactive intervention via a user interface associated with the application.

Clause 2: The method of Clause 1, further comprising determining to proceed with providing the proactive intervention based on one or more previous interventions provided via the user interface.

Clause 3: The method of any one of Clause 1-2, further comprising: determining, by the proactive intervention system, a first intervention priority for the proactive intervention; determining, by the proactive intervention system, an alternative proactive intervention based on the event and the contextual information; determining, by the proactive intervention system, a second intervention priority for the alternative proactive intervention; and determining, by the proactive intervention system, to provide the proactive intervention based on a comparison of the first intervention priority and the second intervention priority.

Clause 4: The method of any one of Clause 1-3, further comprising filtering, by an event watcher component of the proactive intervention system, a stream of events to identify the plurality of events.

Clause 5: The method of Clause 4, further comprising determining, by the event watcher component, the event priorities of the plurality of events based on attributes of the plurality of events.

Clause 6: The method of any one of Clause 1-5, wherein determining, by the proactive intervention system, the proactive intervention based on the event and the contextual information comprises: applying one or more rules; or receiving one or more outputs from a machine learning model in response to inputs provided to the machine learning model based on the event and the contextual information.

Clause 7: The method of any one of Clause 1-6, wherein providing, by the proactive intervention system, the proactive intervention via the user interface associated with the application comprises at least one of: offering automated or assisted support; providing help content; or offering a discount related to the application.

Clause 8: The method of any one of Clause 1-7, wherein the event was generated based on an output from a machine learning model in response to one or more inputs corresponding to one or more other events.

Clause 9: A method for proactive intervention in a software application, comprising: selecting, by a proactive intervention system related to an application, an event of a plurality of events related to use of the application for processing based on event priorities associated with the plurality of events; parsing, by the proactive intervention system, the event to extract one or more intervention-related attributes; receiving, by the proactive intervention system, contextual information related to the event; determining, by the proactive intervention system, a proactive intervention based on the one or more intervention-related attributes and the contextual information; determining, by the proactive intervention system, that the proactive intervention can presently be provided based on intervention availability data; and providing, by the proactive intervention system, the proactive intervention via a user interface associated with the application.

Clause 10: The method of Clause 9, further comprising determining to proceed with providing the proactive intervention based on one or more previous interventions provided via the user interface.

Clause 11: The method of any one of Clause 9-10, further comprising: determining, by the proactive intervention system, a first intervention priority for the proactive intervention; determining, by the proactive intervention system, an alternative proactive intervention based on the event and the contextual information; determining, by the proactive intervention system, a second intervention priority for the alternative proactive intervention; and determining, by the proactive intervention system, to provide the proactive intervention based on a comparison of the first intervention priority and the second intervention priority.

Clause 12: The method of any one of Clause 9-11, further comprising filtering, by an event watcher component of the proactive intervention system, a stream of events to identify the plurality of events.

Clause 13: The method of 12, further comprising determining, by the event watcher component, the event priorities of the plurality of events based on attributes of the plurality of events.

Clause 14: The method of any one of Clause 9-13, wherein determining, by the proactive intervention system, the proactive intervention based on the event and the contextual information comprises: applying one or more rules; or receiving one or more outputs from a machine learning model in response to inputs provided to the machine learning model based on the event and the contextual information.

Clause 15: The method of any one of Clause 9-14, wherein providing, by the proactive intervention system, the proactive intervention via the user interface associated with the application comprises at least one of: offering automated or assisted support; providing help content; or offering a discount related to the application.

Clause 16: The method of any one of Clause 9-15, wherein the event was generated based on an output from a machine learning model in response to one or more inputs corresponding to one or more other events.

Clause 17: A system for proactive intervention in a software application, comprising: one or more processors; and a memory comprising instructions that, when executed by the one or more processors, cause the system to: select, by a proactive intervention system related to an application, an event of a plurality of events related to use of the application for processing based on event priorities associated with the plurality of events; receive, by the proactive intervention system, contextual information related to the event; determine, by the proactive intervention system, a proactive intervention based on the event and the contextual information; determine, by the proactive intervention system, that the proactive intervention can presently be provided based on intervention availability data; and provide, by the proactive intervention system, the proactive intervention via a user interface associated with the application.

Clause 18: The system of Clause 17, wherein the instructions, when executed by the one or more processors, further cause the system to determine to proceed with providing the proactive intervention based on one or more previous interventions provided via the user interface.

Clause 19: The system of any one of Clause 17-18, wherein the instructions, when executed by the one or more processors, further cause the system to: determine, by the proactive intervention system, a first intervention priority for the proactive intervention; determine, by the proactive intervention system, an alternative proactive intervention based on the event and the contextual information; determine, by the proactive intervention system, a second intervention priority for the alternative proactive intervention; and determine, by the proactive intervention system, to provide the proactive intervention based on a comparison of the first intervention priority and the second intervention priority.

Clause 20: The system of any one of Clause 17-19, wherein the instructions, when executed by the one or more processors, further cause the system to filter, by an event watcher component of the proactive intervention system, a stream of events to identify the plurality of events.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for proactive intervention in a software application, comprising:
    providing, by a proactive intervention system related to an application, event information of a plurality of events as inputs to a first machine learning model, wherein:
        the event information comprises clickstream data related to use of the application and contextual information associated with the plurality of events;
        the contextual information comprises user attributes; and
        the first machine learning model has been trained through a supervised learning process to recognize that certain events are correlated with users abandoning use of the application;
    receiving, from the first machine learning model in response to the inputs, abandonment confidence scores for the plurality of events, wherein each of the abandonment confidence scores indicates a likelihood that a user will abandon the application;
    assigning, by the proactive intervention system, priorities to the plurality of events based on the abandonment confidence scores;
    selecting, by the proactive intervention system, an event of the plurality of events for processing based on the priorities assigned to the plurality of events;
    providing, by the proactive intervention system, one or more inputs to a second machine learning model, the one or more inputs including the event information and the abandonment confidence scores, wherein the second machine learning model has been trained through a supervised learning process by which parameters of the second machine learning model were iteratively adjusted based on a training data set comprising attributes of historical events associated with labels indicating that certain proactive interventions are relevant to the historical events;
    determining, by the proactive intervention system, a proactive intervention based on a proactive intervention confidence score with respect to the proactive intervention that is output by the second machine learning model in response to the one or more inputs;
    determining, by the proactive intervention system, that the proactive intervention can presently be provided based on intervention availability data;
    providing, by the proactive intervention system, the proactive intervention via a user interface associated with the application;
    receiving user feedback with respect to the proactive intervention, wherein the second machine learning model is re-trained based on the user feedback to generate a re-trained second machine learning model; and
    using the re-trained second machine learning model to determine a subsequent proactive intervention.

2. The method of claim 1, further comprising determining to proceed with providing the proactive intervention based on one or more previous interventions provided via the user interface.

3. The method of claim 1, further comprising:
    determining, by the proactive intervention system, a first intervention priority for the proactive intervention;
    determining, by the proactive intervention system, an alternative proactive intervention based on the event and the contextual information;
    determining, by the proactive intervention system, a second intervention priority for the alternative proactive intervention; and
    determining, by the proactive intervention system, to provide the proactive intervention based on a comparison of the first intervention priority and the second intervention priority.

4. The method of claim 1, further comprising filtering, by an event watcher component of the proactive intervention system, a stream of events to identify the plurality of events.

5. The method of claim 4, further comprising determining, by the event watcher component, the priorities of the plurality of events based on attributes of the plurality of events.

6. The method of claim 1, wherein determining, by the proactive intervention system, the proactive intervention is further based on applying one or more rules.

7. The method of claim 1, wherein providing, by the proactive intervention system, the proactive intervention via the user interface associated with the application comprises at least one of:
    offering automated or assisted support;
    providing help content; or
    offering a discount related to the application.

8. The method of claim 1, wherein the event was generated based on an output from an additional machine learning model in response to one or more inputs corresponding to one or more other events.

9. The method of claim 1, further comprising:
assigning, by the proactive intervention system, intervention priorities to a plurality of proactive interventions based on one or more outputs of the second machine learning model;
determining, by the proactive intervention system, that a proactive intervention of the plurality of proactive interventions with a highest priority of the intervention priorities cannot presently be provided based on the intervention availability data; and
providing, by the proactive intervention system, based on the determining that the proactive intervention with the highest priority of the intervention priorities cannot presently be provided based on the intervention availability data, an alternative proactive intervention of the plurality of proactive interventions with a second highest priority of the intervention priorities via a user interface associated with the application.

10. A system for proactive intervention in a software application, comprising:
one or more processors; and
a memory comprising instructions that, when executed by the one or more processors, cause the system to:
provide, by a proactive intervention system related to an application, event information of a plurality of events as inputs to a first machine learning model, wherein:
the event information comprises clickstream data related to use of the application and contextual information associated with the plurality of events;
the contextual information comprises user attributes; and
the first machine learning model has been trained through a supervised learning process to recognize that certain events are correlated with users abandoning use of the application;
receive, from the first machine learning model in response to the inputs, abandonment confidence scores for the plurality of events, wherein each of the abandonment confidence scores indicates a likelihood that a user will abandon the application;
assign, by the proactive intervention system, priorities to the plurality of events based on the abandonment confidence scores;
select, by the proactive intervention system, an event of the plurality of events for processing based on the priorities assigned to the plurality of events;
provide, by the proactive intervention system, one or more inputs to a second machine learning model, the one or more inputs including the event information and the abandonment confidence scores wherein the second machine learning model has been trained through a supervised learning process by which parameters of the second machine learning model were iteratively adjusted based on a training data set comprising attributes of historical events associated with labels indicating that certain proactive interventions are relevant to the historical events;
determine, by the proactive intervention system, a proactive intervention based on a proactive intervention confidence score with respect to the proactive intervention that is output by the second machine learning model in response to the one or more inputs;
determine, by the proactive intervention system, that the proactive intervention can presently be provided based on intervention availability data;
provide, by the proactive intervention system, the proactive intervention via a user interface associated with the application;
receive user feedback with respect to the proactive intervention, wherein the second machine learning model is re-trained based on the user feedback to generate a re-trained second machine learning model; and
use the re-trained second machine learning model to determine a subsequent proactive intervention.

11. The system of claim 10, wherein the instructions, when executed by the one or more processors, further cause the system to determine to proceed with providing the proactive intervention based on one or more previous interventions provided via the user interface.

12. The system of claim 10, wherein the instructions, when executed by the one or more processors, further cause the system to:
determine, by the proactive intervention system, a first intervention priority for the proactive intervention;
determine, by the proactive intervention system, an alternative proactive intervention based on the event and the contextual information;
determine, by the proactive intervention system, a second intervention priority for the alternative proactive intervention; and
determine, by the proactive intervention system, to provide the proactive intervention based on a comparison of the first intervention priority and the second intervention priority.

13. The system of claim 10, wherein the instructions, when executed by the one or more processors, further cause the system to filter, by an event watcher component of the proactive intervention system, a stream of events to identify the plurality of events.

14. The system of claim 10, wherein the instructions, when executed by the one or more processors, further cause the system to:
assign, by the proactive intervention system, intervention priorities to a plurality of proactive interventions based on one or more outputs of the second machine learning model;
determine, by the proactive intervention system, that a proactive intervention of the plurality of proactive interventions with a highest priority of the intervention priorities cannot presently be provided based on the intervention availability data; and
provide, by the proactive intervention system, based on the determining that the proactive intervention with the highest priority of the intervention priorities cannot presently be provided based on the intervention availability data, an alternative proactive intervention of the plurality of proactive interventions with a second highest priority of the intervention priorities via a user interface associated with the application.

* * * * *